J. J. MEYER.
LOCKING DEVICE FOR AUTOMOBILES.
APPLICATION FILED DEC. 31, 1913.
1,098,954. Patented June 2, 1914.
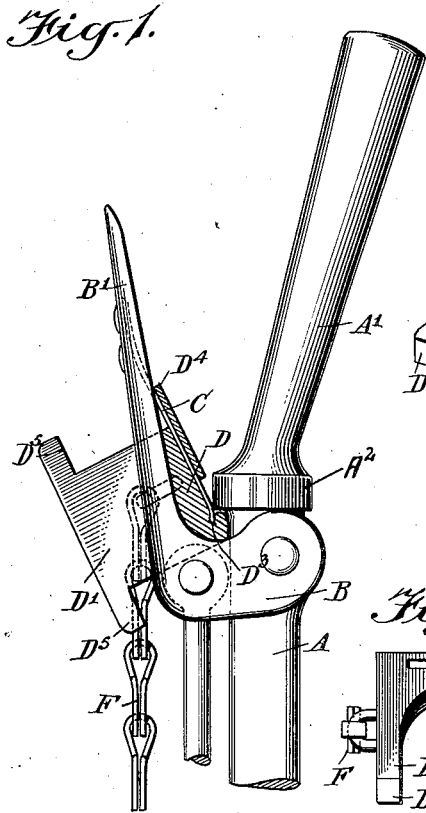
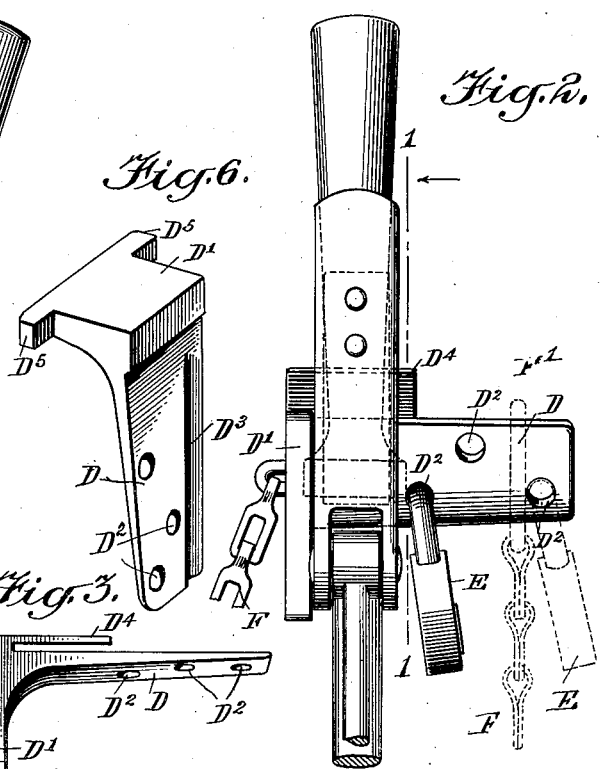
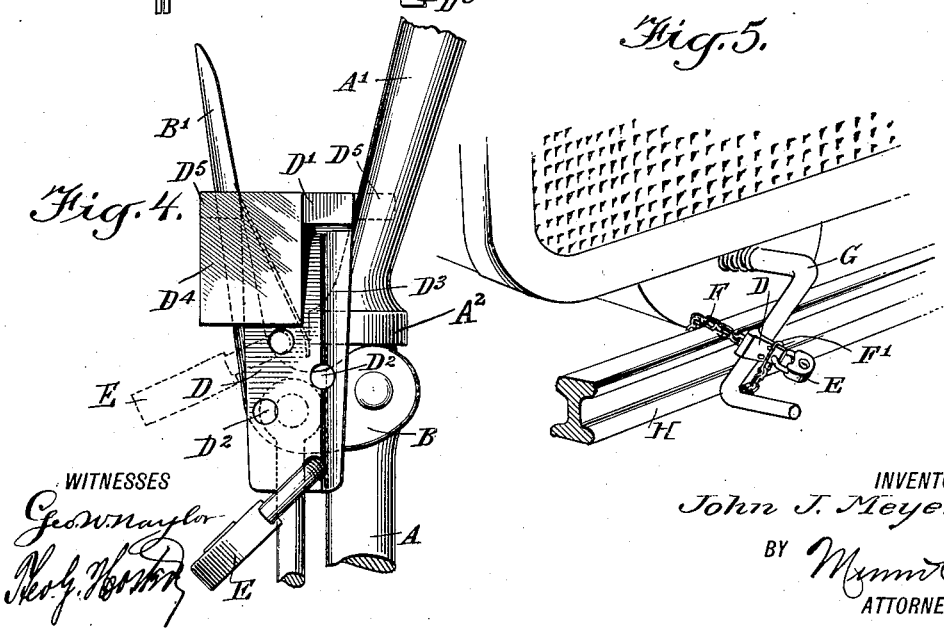
WITNESSES
INVENTOR
John J. Meyer,
BY
ATTORNEYS

UNITED STATES PATENT OFFICE.

JOHN J. MEYER, OF NEW YORK, N. Y.

LOCKING DEVICE FOR AUTOMOBILES.

1,098,954.  Specification of Letters Patent.  Patented June 2, 1914.

Application filed December 31, 1913. Serial No. 809,684.

*To all whom it may concern:*

Be it known that I, JOHN J. MEYER, a citizen of the United States, and a resident of the city of New York, borough of Manhattan, in the county and State of New York, have invented a new and Improved Locking Device for Automobiles, of which the following is a full, clear, and exact description.

The object of the invention is to provide a new and improved locking device for automobiles to prevent theft thereof by preventing unauthorized persons from running the automobile.

A further object of the invention is to provide a simple locking device which can be readily carried about and easily applied even in the dark.

In order to accomplish the desired result use is made of a wedge-shaped key adapted to render the releasing lever inoperative, and a lock for holding the plug against removal.

A practical embodiment of the invention is represented in the accompanying drawings forming a part of this specification, in which similar characters of reference indicate corresponding parts in all the views.

Figure 1 is a sectional side elevation of the wedge-shaped key on the line 1—1 of Fig. 2 and as applied between the handle of the releasing lever and the brake lever; Fig. 2 is an edge view of the same; Fig. 3 is a side elevation of the wedge-shaped key; Fig. 4 is a side elevation of the key as applied between the handle of the brake lever and the handle of the releasing lever; Fig. 5 is a perspective view of the locking device as applied for holding the cranking lever against movement; and Fig. 6 is a perspective view of a simplified form of the key.

Prior to leaving an automobile standing unattended in a public place, it is customary to apply the brake by the use of the emergency brake lever. In order to prevent the release of the brake by an unauthorized person use is made of a locking device, preferably applied to the said emergency brake lever and its release lever to prevent the emergency brake lever from being manipulated with a view to release the brake.

As shown in Figs. 1 and 2, the emergency brake lever A is provided with a release lever B controlling the usual mechanism for locking the emergency brake lever A in whatever position it is moved into, and this release lever B is normally held in locking position by the action of a spring C secured at one end to the handle B' of the release lever B and pressing with its free end on the base of the handle A' of the emergency brake lever A. Into the space between the handle B' and the spring C is inserted a key D in the form of a wedge, which prevents movement of the handle B' toward the handle A' thus preventing an unauthorized person from actuating the emergency brake lever A after the brake has been set. The key D is provided with tapering sides for conveniently inserting the key into the space between the handle B' and the spring C, and the said key is wedge-shaped in a transverse direction to readily conform to the space between the handle B' and the spring C, and the key D is wedge-shaped in a lengthwise direction so as to readily pass into the space between the handle B' and the spring C until the space is completely filled by the key and the free end of the spring C is held from moving away from the base of the handle A'. The base end of the key D is provided with a head D' adapted to rest against one side of the handle B' and the other end of the key D is provided with a series of apertures $D^2$, any one of which is adapted to be engaged by a lock E of any approved construction so as to prevent withdrawal of the key D from its position between the handle B' and the spring C, as will be readily understood by reference to Fig. 2. The lower edge of the key D is preferably somewhat enlarged to fit between the under side of the base $A^2$ of the handle A' and the upper edge of the fulcrum end of the releasing lever B so that the latter cannot be moved into releasing position even if the spring is omitted or broken off. It is understood that when the key is inserted pressure is exerted in both an upward and a downward direction on the handle base $A^2$ and the releasing lever B. At the top of the head D' is secured one end of a chain F provided at its other end with a large link F' adapted to slip over the small end of the wedge-shaped key D to a point beyond one of the apertures $D^2$ to permit of applying the lock E after the link F' is engaged with the key, as indicated in dotted lines in Fig. 2. The chain F forms an additional retaining device to prevent removal of the key from its position between the handles A' and B'. The key D is provided in its flat face with a lengthwise-extending recess or groove $D^3$ into which fits the bent free end of the spring C, and on the base of the key D is secured one end of a shield $D^4$ overlying the spring C so as to protect the same and thereby prevent an unauthorized person from breaking off the spring and removing the key D by slipping the same upward over the handle B'. The shield $D^4$ is shown omitted in the key illustrated in Fig. 6, otherwise the key shown in this figure is the same as above described and illustrated in Figs. 1, 2, 3 and 4.

As illustrated in Fig. 4, the key D may be used in a different manner for holding the handle B' against movement toward the handle A' and in this case the key is applied while in a vertical position with the head D' extending between the handles B' and A'. The head D' is provided with sidewise projecting lugs $D^5$ adapted to rest against the handles B', A' at the back thereof, as indicated in dotted lines in Fig. 4, it being understood that in this case the lock E is applied to the lowermost aperture $D^2$ so as to extend under the lever B and thus prevent the key D from being removed unless the lock E is first unlocked and detached from the key D. The bolt of the lock E may be engaged with the uppermost aperture $D^2$ and the bolt passed through the space between the handle B' and the spring C as shown in dotted lines in Fig. 4.

The locking device may be used for locking the handle G of the cranking device against movement to prevent starting of the motor by an unauthorized person. It will be noticed that in this case the chain F is passed around the front transverse beam H of the chassis of the automobile, and the key D is held against one side of the handle G while the chain F is passed around the other side of the handle and its link F' is slipped onto the key D, after which the lock E is applied to hold the chain F in locking position thus preventing an unauthorized person from turning the handle G. It will also be noticed that the chain F is drawn tight around the handle G after the latter is pushed into engagement with the motor shaft to prevent starting of the motor especially when the automobile is on a down grade. The series of holes $D^2$ allow of locking the chain F when drawn taut as described thus providing means for any variations in the structure.

It will be noticed that the locking device shown and described is very simple and can be readily carried about by the attendant of the automobile, and the locking device can be quickly slipped into position to lock the parts against being manipulated as above explained, so that an unauthorized person cannot actuate the locked parts. It will also be noticed that the locking device when applied is very inconspicuous and is hence not easily detected by unauthorized persons.

Having thus described my invention, I claim as new and desire to secure by Letters Patent:

1. In a locking device for automobiles, the combination of a control lever, a releasing lever fulcrumed on the control lever, a spring interposed between the said levers to hold the releasing lever normally in non-released position, a key inserted between the said releasing lever and its spring, and means for locking the said key in place.

2. In a locking device for automobiles, the combination of a control lever, a releasing lever fulcrumed on the control lever, a spring interposed between the said levers to hold the releasing lever normally in non-released position, a key inserted between the said releasing lever and its spring, the key being provided at one end with a head, and a lock on the other end of the said key.

3. In a locking device for automobiles, the combination of a control lever, a releasing lever, a spring interposed between the levers to hold the releasing lever normally in non-released position, a key inserted between the said releasing lever and its spring to hold the spring in contact with the control lever, and a lock on the outer end of the said key.

4. In a locking device for automobiles, the combination of a control lever having a release lever and a spring interposed between the levers to hold the releasing lever normally in non-released position, of a key inserted between the said releasing lever and its spring to hold the spring in contact with the control lever, a shield on the said key and overlying the said spring, and a lock on the outer end of the said key.

5. In a locking device for automobiles, the combination of a control lever, a releasing lever, a spring interposed between the levers to hold the releasing lever normally in non-released position, a key inserted between the said releasing lever and its spring to hold the spring in contact with the control lever, the face of the key having a lengthwise extending recess into which fits the free end of the spring, and a lock on the outer end of the said key.

6. A locking device for automobiles, comprising a key having tapering sides and being wedge-shaped in the direction of its length and width, the face of the key being provided with a recess extending lengthwise of the key and a lock removably engaging the small end of the said key.

7. A locking device for automobiles, comprising a key having tapering sides and being wedge-shaped in the direction of its length and width, a shield in the form of a protecting plate secured at one end to the base end of the key and spaced from the face of the key, one side of the plate projecting beyond the corresponding side of the key, and a lock removably engaging the small end of the said key.

8. A locking device for automobiles, comprising a key having tapering sides and being wedge-shaped in the direction of its length and width, a chain secured at one end to the base of the key and having at its other end a link adapted to slip over the small end of the key, and a lock removably engaging the small end of the said key.

In testimony whereof I have signed my name to this specification in the presence of two subscribing witnesses.

JOHN J. MEYER.

Witnesses:
 THEO. G. HOSTER,
 PHILIP D. ROLLHAUS.